Figure 1:
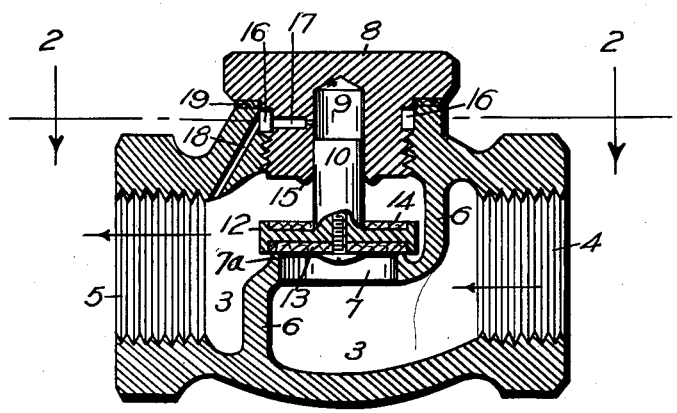

Dec. 3, 1940.     C. A. NORGREN     2,223,699
CHECK VALVE
Filed May 21, 1938

INVENTOR.
CARL A. NORGREN
BY
Rollandet, McGrew & Campbell
ATTORNEYS.

Patented Dec. 3, 1940

2,223,699

UNITED STATES PATENT OFFICE 2,223,699

CHECK VALVE

Carl A. Norgren, Denver, Colo.

Application May 21, 1938, Serial No. 209,256

1 Claim. (Cl. 251—128)

This invention relates to improvements in check valves.

Heretofore it has been common practice to provide check valves having a valve element adapted to open and close with each pulsation of a fluid being pumped therethrough. This rapid opening and closing of the valve ordinarily leads to wearing of the moving parts and premature deterioration of the valve disk, gasket or other sealing means. Furthermore, valve mechanism of the common type interposes a constant factor of resistance to the free flow of fluid therethrough and may result in a noisy valve hammer condition. Under normal circumstances it is not essential that a check valve open and close with each pulsation.

It is an object of the present invention to provide a check valve having a valve element that may be opened by the action of a fluid under pressure and which has means for delaying the closing of the valve element so that rapid opening and closing of the valve with the pump pulsations, are eliminated.

Another object of the invention is to provide a valve of the character that is double acting in that it forms a seal in its normal closed position and also a seal in its extreme open position to facilitate its delayed closing.

A further object is to provide a valve having the above advantageous features, that is adaptable for use with any ordinary fluid under pressure and that may be connected into any pipe line, conduit or the like.

Figure 2:
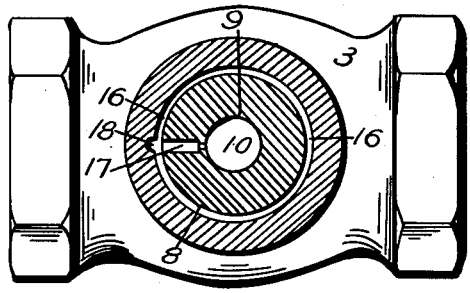

Other objects and advantages reside in details of design and construction which will be more fully disclosed in the following description and in the drawing wherein like parts have been similarly designed and in which:

Figure 1 is a longitudinal section of a valve built according to the present invention; and Figure 2 is a transverse section thereof taken along line 2—2 of Figure 1.

In the drawing reference character 3 denotes a valve body made of suitable material such as iron, steel, bronze or the like, having an inlet passage for pressure fluid at 4 and a corresponding outlet passage for the same at 5. A partition 6 is positioned across the valve body and provides a port 7 between the said inlet and outlet passages. The passages may be threaded as shown or otherwise adapted to fit into a pipe line, conduit, or the like, or they may be connected to a pump or a storage receiver according to installation requirements.

At 8 is shown a threaded plug that is screwed into the valve body 3 and which provides access to the interior of the valve. The plug is provided with a central cylindrical bore 9 that houses valve stem 10 on a valve element 12 that is provided with a lower sealing disk or gasket 13 and an upper sealing disk or gasket 14. The valve element 12, inclusive of the stem 10, is mounted for up and down movement to open and close the port 7 under the influence of pressure fluid and gravity, respectively.

On the lower surface of the plug 8 around the valve stem 10 is an annular raised valve-seat 15 that is positioned to cooperate with the upper disk or gasket 14 when the valve element is in its extreme open or raised position. The plug 8 is further provided with an annular peripheral groove 16 and a small radial passage 17 that connects the groove with the interior of the cylindrical bore or housing 9. Another passage 18 leads through a wall of the body 3 to connect the annular groove 16 with the interior of the valve body at a point therein on the discharge side of the valve. A sealing gasket 19 effects a leak-proof seal between the flanged top of the plug 8 and the valve body 3.

Operation

The flow of fluid under pressure enters through passage 4, passes through port 7 and discharges through passage 5 as indicated by the arrows. The force and pressure of the fluid acts upon the valve element to raise it against the upper valve-seat 15. As the fluid passes through the valve, pressure within the passage 18, the annular groove 16, the passage 17, and the cylindrical bore 9, is reduced due to the velocity of the pressure fluid, establishing a partial vacuum therein by entraining a portion of the air or other fluid that may be present in these passages and the groove.

Since the valve element has been raised so that a seal is established around the valve stem 10 on the valve-seat 15, no pressure fluid can be forced up around the valve stem into the bore 9. Since the pressure in the bore 9 is, by virtue of the above explained arrangement, less than that in the valve body immediately below the valve element, the valve will remain in its raised or open position as long as there is a flow of pressure fluid through the valve body. The reduced pressure in the bore 9 retards the return of the valve element by gravity so that the valve does not reciprocate with each pulsation of the pressure fluid but rather it remains in its extreme open position as long as any fluid is flowing through the valve body and for a limited period of time thereafter.

As illustrated in the drawing, the radial passage 17 connects with the cylindrical bore 9 by means of a very small or minute opening. The passage 17 connects with the annular groove 16 by means of a relatively much larger opening. The advantage in this arrangement is that the minute opening connecting passage 17 with the cylindrical bore 9, introduces a retarding factor in the action of the entire valve. Furthermore, this minute opening is more readily sealed by the valve stem 10 when it is in its upper position than would be the case if passage 17 were connected with the cylindrical bore with as large an opening as connects it with the annular groove 16. In a valve of this kind, some lubricant is always present around the valve stem to insure its operation. Furthermore, when a valve of this kind is installed in a compressed air line, serving a pneumatic tool, for instance, more or less lubricant is carried in the compressed air. Under normal operating conditions, therefore, lubricant is usually present along the surface of the valve stem 10 and in the interior of cylindrical bore 9. As a consequence of the minute area of the connecting aperture between passage 17 and cylindrical bore 9, lubricant or other liquid that may be present, tends to form a temporary seal, when the valve stem 10 is in its upper position, closing passage 17 and materially assisting in holding the valve stem up in the cylindrical bore 9 until some time after all venturi or suction effect in passage 18 has ceased. This temporary sealing of the passage 17 tends to prolong the period during which a reduced pressure exists in the cylindrical bore 9. If the entire passage 17 were as small as its connection with the cylindrical bore 9, then too great a factor of resistance would be introduced. The arrangement of passage 17 as clearly illustrated, has been found to produce optimum operating characteristics.

After the fluid has ceased to flow in the direction of the arrows the valve element will slowly assume its lowermost closed position over the port 7 on the seat 7a thereof. By this arrangement the improved check valve opens and closes but once during any pumping period and is relieved from the ordinary wear and tear occasioned by rapid opening and closing induced by pump pulsations in a fluid medium. The annular groove 16 in the plug element 8 provides a positive connection between the passage 18 in the valve body and the radial passage 17 connecting with the bore 9 in the plug, regardless of the position of the plug 8 after it has been screwed into the valve body to a tight-sealing engagement with the gasket 19. No exact matching of the radial passage 17 and the other passage 18 is required.

While the valve element 12 is here illustrated and described as being closable by the force of gravity, obviously, mechanical means may be employed to facilitate such closing.

This improved valve is particularly well adapted for installation in a pipe line connecting a pulsating type pump with a storage receiver such as, for instance, in a pipe line connecting a reciprocating air compressor with an air storage tank. In such an installation the valve opens when the pump is started and remains open until the pump is stopped, whereupon it closes and effectively prevents the reverse flow of the compressed air from the storage tank back toward the compressor. In such an installation the improved valve reduces the frictional resistance to the flow of air and also reduces the resistance of the inertia required to rapidly and repeatedly open the valve element, both of which unfavorable factors are commonly present in ordinary check valves. Furthermore, valve hammer and noise are completely removed and the life of the improved valve, especially the sealing elements thereof, will normally be longer than that of the corresponding parts in ordinary check valves.

Changes in mechanical details may occur to those skilled in the art and may be made without departing from the spirit of the invention as set forth in the appended claim.

What I claim and desire to secure by Letters Patent is:

In a check valve having a hollow body provided with inlet and outlet passages for the normal one-directional flow of fluid under pressure therethrough and a partition across the body providing a port between said passages, the improvement which comprises a double acting valve element having a stem and adapted to open the port by pressure of the fluid and to effect a delayed closure of the port against reverse flow of the fluid, a plug threaded into the body and having a cylindrical bore in which the stem of the valve element is positioned for reciprocating movement, an annular groove around the periphery of the plug and surrounding the cylindrical bore, a radial passage connecting the cylindrical bore with the annular groove, the area of the connection of said radial passage with the cylindrical bore being relatively small as compared with the area of the connection of said passage with the annular groove, and a suction passage of relatively larger area than said restricted connection inclined with reference to the valve stem in the direction of normal flow of fluid through the valve and open to said flow and to said annular groove in a position to receive a suction effect from the normal flow of fluid thus retarding the closing movement of the valve element.

CARL A. NORGREN.